Patented Dec. 15, 1931

1,836,431

UNITED STATES PATENT OFFICE

JAMES BADDILEY AND ERNEST CHAPMAN, OF BLACKLEY, MANCHESTER, ENGLAND, ASSIGNORS TO BRITISH DYESTUFFS CORPORATION LIMITED, OF BLACKLEY, MANCHESTER, ENGLAND

WETTING-OUT AGENT OR EMULSIFIER

Application filed March 28, 1929, Serial No. 350,804, and in Great Britain March 30, 1928.

In the specification of our application Serial No. 195,585, we have described the manufacture of new and powerful wetting-out agents by the sulphonation and alkylation of certain mineral oil fractions. In the examples there given sulphuric acid of strength up to 101.5% is used and the temperature prescribed in each case is above 100° C. The process can be briefly described as comprising the sulphonation and condensation of various mineral oil fractions boiling between 150° and 300° C. with sulphuric acid and an alcohol. Various alcohols can be used, such as isopropyl, normal propyl, isobutyl, benzyl and cyclohexanol, as mentioned in Example 3 of the above application. We have found that improved results are obtained by conducting the said reactions at temperatures between 60° and 65° C., and even lower; the product under such conditions is lighter in colour and the yield is somewhat higher. We have also found that the process may be simplified by adding the alcohol to the sulphonation bath directly instead of previously mixing the alcohol with sulphuric acid and then adding the mixture; a saving of time and expense is thus effected. Alternatively, the alcohol and oil may be mixed together; and the sulphonating agent then added. Other sulphonating agents than sulphuric acid itself may be used with good results, and in the present application we give an example in which chlorosulphonic acid is the agent employed; this agent is particularly suitable when it is desired to work at the lower temperatures, e. g., 15-30° C.

The improved process is illustrated by the following examples, in which the parts are by weight.

*Example 1.*—63 parts of a petroleum fraction, obtained by the usual commercial process of extracting Borneo petroleum with liquid sulphur dioxide and having a boiling range of 150-300° C. are added during one hour to 68 parts of weak oleum (101.5%) or 100% sulphuric acid with stirring, and the temperature then maintained during 2 hours at 60-65° C. After allowing to cool and settle, any unsulphonated oil is separated. 30 parts of sulphuric acid (96%) are then added to the sulphonation mixture with stirring at ordinary temperature, followed by the gradual addition during 1 hour of 18 parts of isopropyl alcohol. During this addition the temperature may rise to about 40° C. The mixture is then warmed to 60-65° C. for 3 hours, after which the condensation is complete. The product may be worked up to the sodium salt in the manner described in specification of application Serial No. 195,585, or the reaction mixture may be allowed to stand and the lower sulphuric acid layer separated from the upper viscid layer of condensation product, which is then dissolved in water, limed out and converted into the sodium salt, or may be directly neutralized and evaporated.

*Example 2.*—60 parts of chlorosulphonic acid are added to a mixture of 42 parts oil and 18 parts isopropyl alcohol at 20–25° C. during 1 hour with stirring. The mixture is maintained at 20–25° C. for an hour or more with constant agitation, when condensation and sulphonation are complete. The viscid product is poured into water, limed out and converted into sodium salt in the usual manner; or the aqueous solution of the product may be directly neutralized and evaporated.

In the above example we may use in place of the isopropyl alcohol 22.2 parts of normal butyl alcohol. This is added at 50-55° C., and the mixture heated at this temperature for 4 hours.

What we claim and desire to secure by Letters Patent is:—

1. The process of manufacturing a wetting-out agent from mineral oil fractions boiling between 150° and 300° C. which comprises sulphonating the oil and condensing with a saturated, mono-hydroxy alcohol; the said process being conducted at temperatures not exceeding 65° C.

2. A process according to claim 1 further characterized by the use of chlorosulphonic acid as sulphonating agent.

3. In the manufacture of wetting-out agents, the process which comprises sulphonating a sulphur dioxide extract of petroleum, boiling between 150° and 300° C., and condensing the product with a saturated, monohydroxy alcohol; the whole process being conducted at temperatures not exceeding 65° C.

4. In the manufacture of wetting-out agents, the process which comprises sulphonating a sulphur dioxide extract of petroleum, boiling between 150° and 300° C., and condensing the product with an alcohol selected from a group comprising isopropyl alcohol, normal propyl alcohol, isobutyl alcohol, benzyl alcohol, normal butyl alcohol and cyclohexanol; the whole process being conducted at temperatures not exceeding 65° C.

5. In the manufacture of wetting-out agents, the process which comprises sulphonating a sulphur dioxide extract of petroleum, boiling between 150° and 300° C., and condensing the product with isopropyl alcohol; the whole process being conducted at temperatures not exceeding 65° C.

6. In the manufacture of wetting-out agents, the process which comprises sulphonating a sulphur dioxide extract of petroleum, boiling between 150° and 300° C., and condensing the product with a normal butyl alcohol, the whole process being conducted at temperatures not exceeding 65° C.

7. In the manufacture of wetting-out agents, the process which comprises sulphonating with chlorosulphonic acid a sulphur dioxide extract of petroleum, boiling between 150° and 300° C., and condensing the product with a saturated, mono-hydroxy alcohol; the whole process being conducted at temperatures not exceeding 65° C.

8. In the manufacture of wetting-out agents, the process which comprises sulphonating with chlorosulphonic acid a sulphur dioxide extract of petroleum, boiling between 150° and 300° C., and condensing the product with an alcohol selected from a group comprising isopropyl alcohol, normal propyl alcohol, isobutyl alcohol, benzyl alcohol, normal butyl alcohol and cyclohexanol; the whole process being conducted at temperatures not exceeding 65° C.

9. In the manufacture of wetting-out agents, the process which comprises sulphonating with chlorosulphonic acid a sulphur dioxide extract of petroleum, boiling between 150° and 300° C., and condensing the product with isopropyl alcohol; the whole process being conducted at temperatures not exceeding 65° C.

10. In the manufacture of wetting-out agents, the process which comprises sulphonating with chlorosulphonic acid a sulphur dioxide extract of petroleum, boiling between 150° and 300° C., and condensing the product with a normal butyl alcohol; the whole process being conducted at temperatures not exceeding 65° C.

11. In the manufacture of wetting-out agents from mineral oil fractions having a boiling range between 150 and 300° C., the process which comprises mixing said mineral oil fractions with a sulphonating agent, heating the mixture to a temperature not exceeding 65° C. to effect reaction and produce a sulphonated material, adding a saturated, mono-hydroxy alcohol to the sulphonated material thus produced, heating the mixture of alcohol and sulphonated material to a temperature not exceeding 65° C. to effect condensation and produce a sulphonated condensation product, and then isolating the sulphonated condensation product thus obtained.

12. In the manufacture of wetting-out agents from mineral oil fractions having a boiling range between 150 and 300° C., the process which comprises mixing said mineral oil fractions with monohydrate of sulphuric acid, heating the mixture to a temperature not exceeding 65° C. to effect reaction and to produce a sulphonated material, adding a saturated, mono-hydroxy alcohol to the sulphonated material thus produced, heating the mixture of alcohol and sulphonated material to a temperature not exceeding 65° C. to effect condensation and produce a sulphonated condensation product, and then isolating the sulphonated condensation product thus obtained.

13. In the manufacture of wetting-out agents from mineral oil fractions having a boiling range between 150 and 300° C., the process which comprises mixing said mineral oil fractions with monohydrate of sulphuric acid, heating the mixture to a temperature between 60 and 65° C. to effect reaction and produce a sulphonated material, separating unsulphonated oil, mixing said sulphonated material with concentrated sulphuric acid and a saturated, mono-hydroxy alcohol, heating the mixture of alcohol, concentrated sulphuric acid and sulphonated material to a temperature between 60 and 65° C. to effect condensation and produce a sulphonated condensation product and then isolating the sulphonated condensation product thus obtained in the form of the alkali metal salt thereof.

14. In the manufacture of wetting-out agents from mineral oil fractions having a boiling range between 150 and 300° C., the process which comprises mixing said mineral oil fractions with chlorosulphonic acid and a saturated, mono-hydroxy alcohol, heating the mixture to a temperature not exceeding 65° C. to simultaneously effect sulphonation and condensation and produce a sulphonated condensation product and then isolating the sulphonated condensation product thus obtained.

15. In the manufacture of wetting-out agents from mineral oil fractions having a boiling range between 150 and 300° C., the process which comprises mixing said mineral oil fractions with a saturated, mono-hydroxy alcohol, adding chlorosulphonic acid to the mixture of said oil and alcohol, heating the mixture to a temperature between 20 and 25° C. to simultaneously effect sulphonation and condensation and then isolating the sulphonated condensation product thus produced in the form of the alkali metal salt thereof.

16. In the manufacture of wetting-out agents from mineral oil fractions having a boiling range between 150 and 300° C., the process which comprises mixing said mineral oil fractions with a saturated, mono-hydroxy alcohol, adding chlorosulphonic acid to the mixture of said oil and alcohol, heating the mixture to a temperature between 20 and 25° C. to simultaneously effect sulphonation and condensation and then isolating the sulphonated condensation product, mixing the reaction product thus obtained with water, neutralizing the aqueous solution thus obtained with lime and then isolating the sulphonated condensation product in the form of the sodium salt thereof.

17. The process of claim 16 in which the alcohol is isopropyl alcohol.

18. The process of claim 16 in which the alcohol is normal butyl alcohol.

19. In the manufacture of wetting-out agents from mineral oil fractions having a boiling range between 150 and 300° C., the process which comprises sulphonating the said mineral oil and condensing with a saturated, mono-hydroxy alcohol, the said process being conducted at temperatures not exceeding 65° C. and the said sulphonation being effected by heating the said mineral oil fractions in the presence of a sulphonating agent, the said mineral oil fractions and the said sulphonating agent being in the proportion of one part of said oil to more than one part of said sulphonating agent.

20. In the manufacture of wetting-out agents from mineral oil fractions having a boiling range between 150 and 300° C., the process which comprises mixing one part of said mineral oil fractions with more than one part of monohydrate of sulphuric acid, heating the mixture to a temperature between 60 and 65° C. to effect reaction and produce a sulphonated material, separating the unsulphonated oil, mixing the sulphonated material thus obtained with a saturated, mono-hydroxy alcohol, heating the mixture of alcohol and sulphonating material to a temperature between 60 and 65° C. to effect condensation and produce a sulphonated condensation product, and then isolating the sulphonated condensation product in the form of the alkali metal salt thereof.

21. In the manufacture of wetting-out agents from mineral oil fractions having a boiling range between 150 and 300° C., the process which comprises mixing one part of said mineral oil fractions with more than one part of monohydrate of sulphuric acid, heating the mixture to effect reaction and produce a sulphonated material, separating unsulphonated oil, mixing the said sulphonated material with concentrated sulphuric acid and gradually adding to the mixture a saturated, mono-hydroxy alcohol, heating the mixture thus produced to a temperature between 60 and 65° C. and then isolating the sulphonated condensation product thus produced in the form of the alkali metal salt.

22. In the manufacture of wetting-out agents from mineral oil fractions having a boiling range between 150 and 300° C., the process which comprises mixing one part of said mineral oil fractions with more than one part of monohydrate of sulphuric acid, heating the mixture to effect reaction and produce a sulphonated material, separating the unsulphonated oil, mixing the said sulphonated material with concentrated sulphuric acid and gradually adding to the mixture a saturated, mono-hydroxy alcohol, heating the mixture thus produced to a temperature between 60 and 65° C. to effect condensation and produce a sulphonated condensation product, mixing the sulphonated condensation product thus produced with water, neutralizing the said aqueous solution, removing the excess sulphuric acid by means of lime, and then isolating the sulphonated condensation product in the form of the sodium salt thereof.

In testimony whereof we affix our signatures.

JAMES BADDILEY.
ERNEST CHAPMAN.